(12) United States Patent
Pauley et al.

(10) Patent No.: US 7,094,033 B2
(45) Date of Patent: Aug. 22, 2006

(54) METHODS AND APPARATUS FOR ASSEMBLING GAS TURBINE ENGINES

(75) Inventors: Gerald Alexander Pauley, Hamilton, OH (US); Brian Paul Overbeck, Westchester, OH (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 10/761,852

(22) Filed: Jan. 21, 2004

(65) Prior Publication Data

US 2005/0155342 A1  Jul. 21, 2005

(51) Int. Cl.
F02K 3/04 (2006.01)
(52) U.S. Cl. .................. 416/193 A; 60/226.1
(58) Field of Classification Search ............. 60/39.091, 60/223, 226.1; 416/193 A, 224, 241 R, 248
See application file for complete search history.

(56) References Cited

U.S. PATENT DOCUMENTS

| | | | |
|---|---|---|---|
| 3,155,536 A * | 11/1964 | Fremann et al. | 416/224 |
| 3,494,539 A * | 2/1970 | Littleford | 416/193 R |
| 5,836,744 A | 11/1998 | Zipps et al. | |
| 6,217,283 B1 | 4/2001 | Ravenhall et al. | |
| 6,832,896 B1 * | 12/2004 | Goga et al. | 416/193 A |

* cited by examiner

*Primary Examiner*—Louis J. Casaregola
(74) *Attorney, Agent, or Firm*—William Scott Andes; Armstrong Teasdale LLP

(57) ABSTRACT

A method for assembling a fan platform for a gas turbine engine is provided. The method includes determining an area of vulnerability to impact and erosion damage across the platform, forming a sheet of cladding metal to substantially conform to a contour of the identified area of vulnerability of the platform, and bonding the cladding metal to the identified area of vulnerability.

15 Claims, 4 Drawing Sheets

METHODS AND APPARATUS FOR ASSEMBLING GAS TURBINE ENGINES

BACKGROUND OF THE INVENTION

This invention relates generally to gas turbine engines, and more particularly, to methods and apparatus for operating gas turbine engines.

At least some known gas turbine engines include, in serial flow arrangement, a fan assembly, a low pressure compressor, a high pressure compressor, a combustor, a high pressure turbine, and a low pressure turbine. The high pressure compressor, combustor and high pressure turbine are sometimes collectively referred to as the core engine. Known fan assemblies include a plurality of circumferentially-spaced apart fan blades that extend radially outwardly from a rotor or disk. Each fan blade includes an airfoil section and an integral dovetail root section. The dovetail section is received in a complimentarily configured dovetail slot formed in the rotor.

At least some known fan assemblies may be susceptible to damage resulting from the ingestion of foreign objects such as birds or hailstones into the fan. More specifically, when a foreign object impacts a fan blade, the fan blade, or a portion of the blade, may break off from the rotor disk potentially damaging adjacent fan blades or other engine assemblies or, if not contained by the fan casing, the aircraft itself.

To facilitate reducing an amount of blade material lost during an ingestion event, at least some known fan assemblies permit limited blade rotation within the dovetail slot when a sufficiently high force is exerted on the blade. Such limited blade rotation is beneficial in facilitating prevention of blade breakage. In other known fan assemblies, a fan platform extending between adjacent fan blades is fabricated with regions adjacent the fan blades that are frangible so as to preserve the rotation capability of the blades in impact situations. Furthermore, within at least some known assemblies, the fan platform may be fabricated from lightweight composite materials. Although such materials may provide better weight and fatigue advantages compared to metallic materials, the composite materials generally are more brittle than the metallic materials, and as such, may be more susceptible to damage from impact with foreign objects, especially at or near the frangible areas of the platform.

BRIEF DESCRIPTION OF THE INVENTION

In one aspect, a method for assembling a fan platform for a gas turbine engine is provided. The method includes determining an area of vulnerability to impact damage across the platform, forming a sheet of cladding metal to substantially conform to a contour of the identified area of vulnerability of the platform, and bonding the cladding metal to the identified area of vulnerability.

In another aspect, a fan platform for a gas turbine engine is provided. The platform includes a body portion and a flow path surface coupled to the body portion. The body portion and the flow path surface define at least a portion of a flow path, extending through the engine. An impact barrier reinforces the flow path surface. The impact barrier includes a layer of cladding metal having a contour that substantially conforms to a contour of the flow path surface. The cladding metal is bonded to the flow path surface.

In yet another aspect, a gas turbine engine is provided. The engine includes a fan having a plurality of circumferentially spaced fan blades and a fan platform extending between a pair of circumferentially adjacent fan blades and defining a fan flow path therebetween. The platform includes a flow path surface. A portion of the flow path surface includes a layer of cladding metal bonded thereto. The cladding metal has a contour that substantially conforms to a contour of the flow path surface.

DETAILED DESCRIPTION OF THE INVENTION

Figure 1:
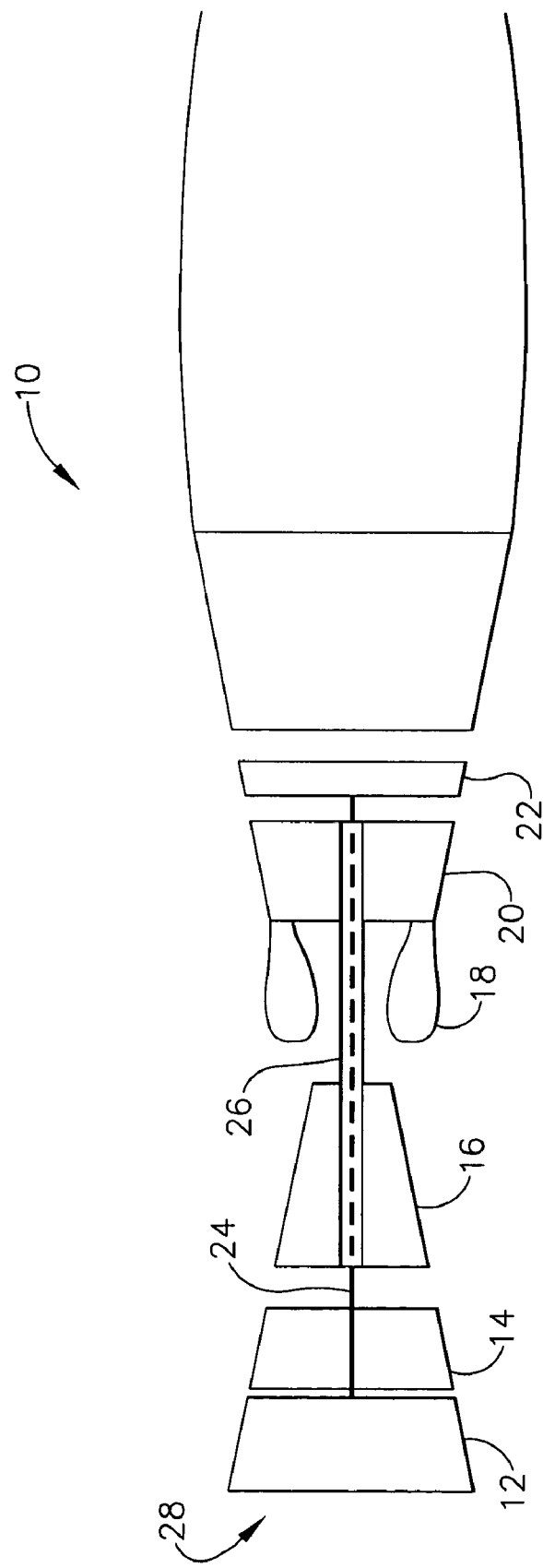
FIG. 1 is a schematic illustration of an exemplary gas turbine engine.

FIG. 1 is a schematic illustration of an exemplary gas turbine engine 10. Engine 10 includes a fan assembly 12, a low pressure compressor 14, a high pressure compressor 16, and a combustor assembly 18. Engine 10 also includes a high pressure turbine 20, and a low pressure turbine 22 arranged in a serial, axial flow relationship. Fan 12, compressor 14 and turbine 22 are coupled by a first shaft 24, and compressor 16 and turbine 20 are coupled by a second shaft 26. In one embodiment, engine 10 is a GE90 engine commercially available from General Electric Company, Cincinnati, Ohio.

In operation, air flows through fan assembly 12 and low pressure compressor 14 from an upstream side 28 of engine 10. In the exemplary embodiment, a portion of the airflow exiting fan 12 is delivered to low pressure compressor 14 while the remaining airflow exiting fan 12 bypasses compressor 14 for various uses about engine 10 and aircraft (not shown). Compressed air is supplied from low pressure compressor 14 to high pressure compressor 16. Compressed air is then delivered to combustor assembly 18 where it is mixed with fuel and ignited. Combustion gases are channeled from combustor 18 to drive turbines 20 and 22.

Figure 2:
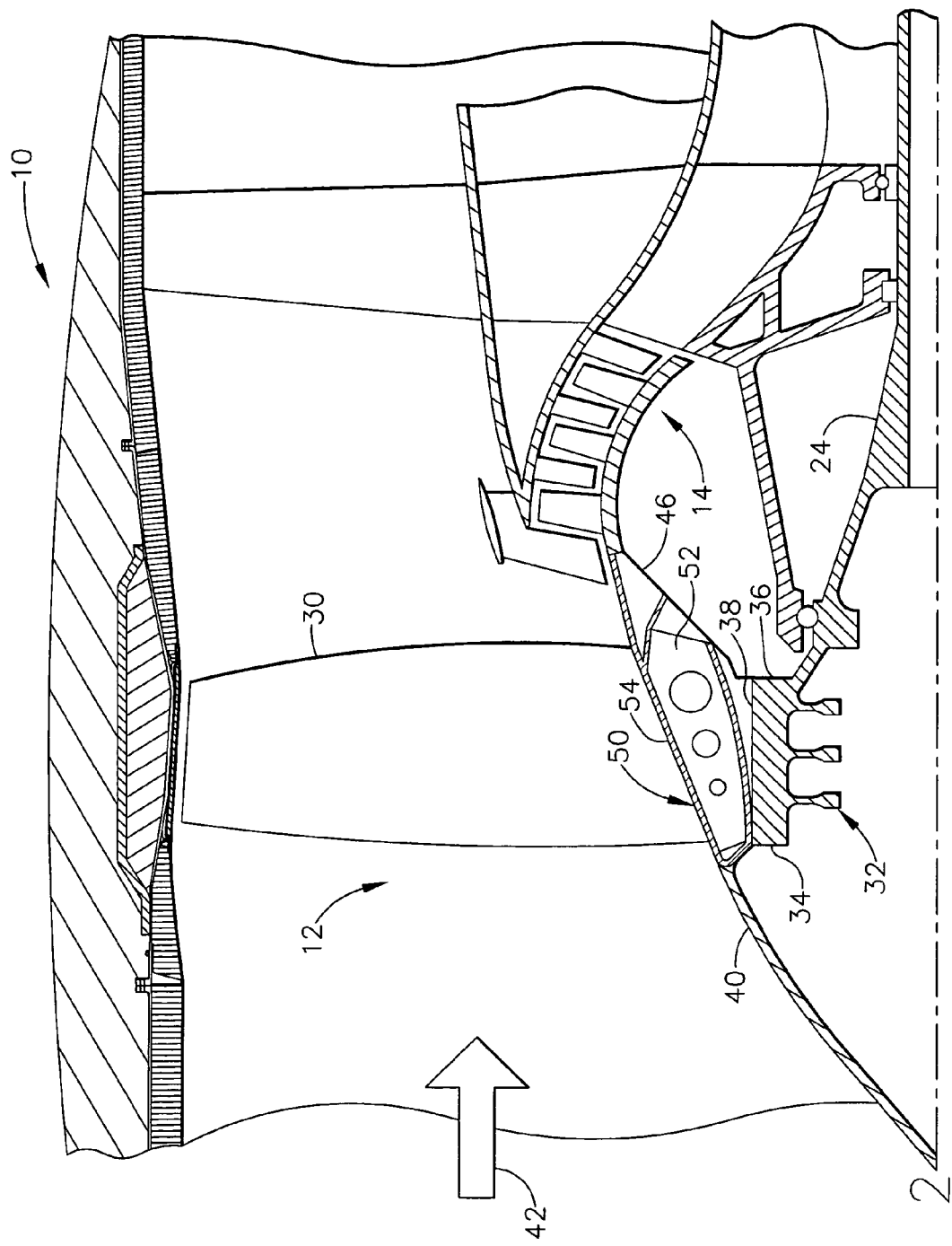
FIG. 2 is an enlarged schematic illustration of a fan assembly included with the engine shown FIG. 1.

FIG. 2 is an enlarged schematic illustration of fan assembly 12. Fan assembly 12 includes a plurality of fan blades 30 that are circumferentially-spaced around rotor disk 32. Rotor disk 32 has axially-spaced apart upstream and downstream sides 34 and 36, respectively that are separated by a radially outer surface 38. Rotor disk 32 is coupled to first shaft 24. A conical spinner 40 is coupled to rotor disk upstream side 34 to define a substantially aerodynamic flow path boundary for air flow 42 entering fan assembly 12. Low pressure compressor 14 is downstream from fan assembly 12 and includes a spool 46 that is coupled to downstream side 36 of rotor disk 32.

Fan assembly 12 also includes a plurality of discreet fan platforms 50 that are each positioned between adjacent fan blades 30. Fan platform 50 extends substantially over radially outer surface 38 and each platform 50 includes a body 52 and a radially outer flow path surface 54 that extends substantially from conical spinner 40 to spool 46. Flow path surface 54 defines a substantially aerodynamic flow path surface for air flow between adjacent fan blades 30 and from conical spinner 40 to low pressure compressor 14.

Figure 3:
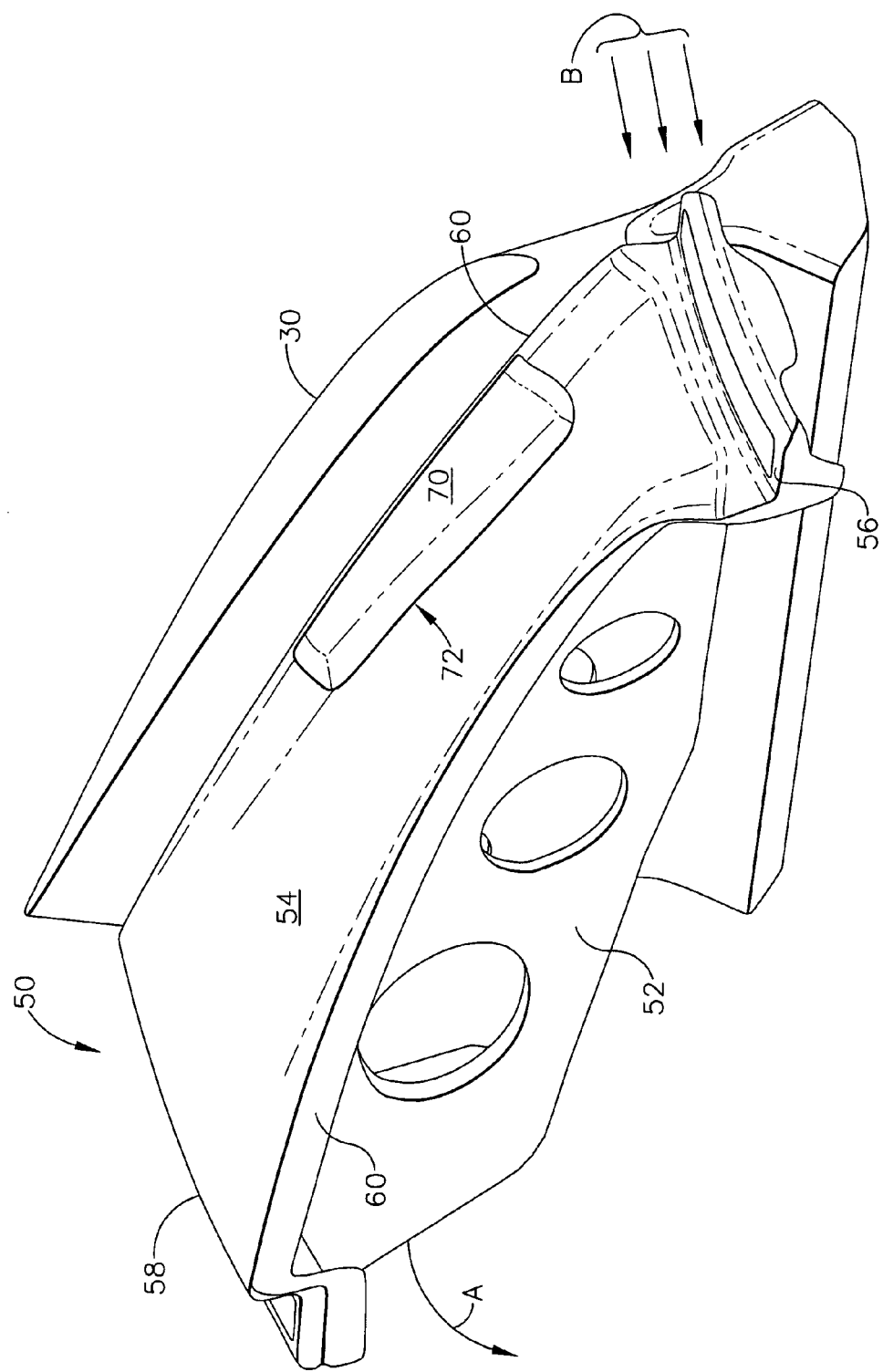
FIG. 3 is a perspective view of a fan platform and a truncated fan blade included in the fan assembly shown in FIG. 2.
Figure 4:
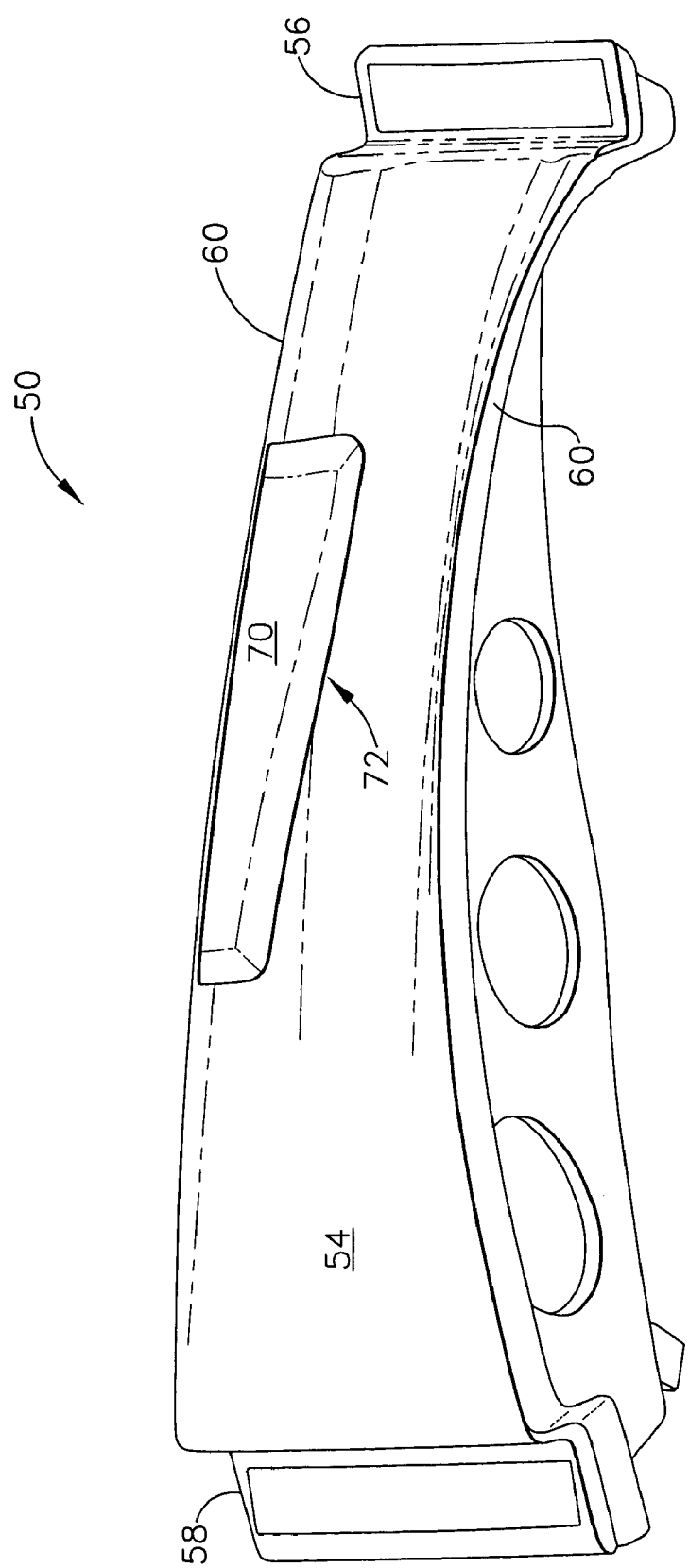
FIG. 4 is a perspective view of the fan platform shown in FIG. 3 and separated from the fan blade.

FIG. 3 is a perspective view of fan platform 50 coupled within fan assembly 12 adjacent a fan blade 30 that is truncated for clarity. FIG. 4 is a perspective view of the fan platform 50 removed from fan assembly 12. Platform 50 has an upstream end 56 and a downstream end 58. Frangible side edges 60 abut fan blades 30 and are crushable to permit continued rotation of fan blade 30 without causing damage to fan blade 30, in the event a foreign object impacts fan blade 30.

Platform 50 is fabricated from a lightweight composite material. In an exemplary embodiment, platform 50 is fabricated from carbon fiber using a resin transfer molding process. Composite materials generally have desirable fatigue characteristics, but such materials may be brittle and lack impact or erosion durability. Accordingly, to facilitate enhancing the impact resistance and durability of platform 50, at least a portion of flow path surface 54 is metal clad to define an impact barrier or hailplate 70 extending at least partially across flow path surface 54. More specifically, in the exemplary embodiment, hailplate 70 is formed adjacent frangible edge 60 to facilitate enhancing impact durability without significantly affecting the load required to crush frangible edge 60.

Sizing and placement of hailplate 70 is variably selected based on a direction of fan rotation, indicated by arrow A, and based on estimated trajectories of incoming hailstones or other foreign objects, as indicated by arrows B and is described in more detail below. For example, rotation of fan blades 30, combined with probable trajectories of incoming hailstones or other foreign objects, enables at least some areas on flow path surface 54 to be identified as being at a reduced risk of impact. These considerations allow for limited sizing of hailplate 70, such that hailplate 70 may be coupled in areas of greatest vulnerability, such as along an upstream portion 72 of platform 50 as indicated by the placement of hailplate 70 in FIG. 3.

In the exemplary embodiment, hailplate 70 is positioned adjacent frangible edge 60 and closer to upstream end 56 than to downstream end 58 such that an area of flow path surface 54 identified as being more vulnerable to a foreign object impact is substantially covered by hailplate 70. Accordingly, hailplate 70 provides impact durability to flow path surface 54, without significantly affecting frangibility of edge 60.

Hailplate 70 is a layer of metal cladding that is formed with a contour that substantially mates against at least a portion of a contour of flow path surface 54. In the exemplary embodiment, hailplate 70 is fabricated from aluminum. It should be understood, however, that hailplate 70 could be fabricated from other materials. A thickness of hailplate 70 is variably selected to provide a desired level of impact or erosion resistance. For example, when hailplate 70 is fabricated from aluminum, hailplate 70 has a thickness ranging from approximately 0.010 to 0.030 inches, wherein 0.020 inches is considered to provide an optimum balance between weight, material strength, and material cost.

Fan rotational speed and probable foreign object trajectory are considered, as described above, to determine an area of vulnerability along flow path surface 54. Hailplate 70 is sized to extend over the identified area of vulnerability. Once the position of hailplate 70 on flow path surface 54 is determined, in the exemplary embodiment, a sheet of annealed aluminum is cold-formed to the contour of the area of flow and aft surface 54 being covered. After being formed, the sheet metal hailplate 70 is heat-treated and aged to facilitate improving the strength of the material. Next, hailplate 70 is surface-etched in preparation for bonding to platform 50, and an anodized coating is applied to hailplate 70 to facilitate insulating hailplate 70 from platform 50. Insulating hailplate 70 from platform 50 facilitates preventing a galvanic reaction between the carbon fiber within platform 50 and the aluminum of hailplate 70 which could cause corrosion of the aluminum material.

Anodized hailplate 70 is then bonded to platform 50 using a supported film adhesive that includes a fiberglass grid, or scrim layer, between the hailplate 70 and platform 50. The scrim layer also insulates the aluminum in hailplate 70 from the carbon fiber in platform 50. Moreover scrim layer in the adhesive also facilitates maintaining a desired adhesive film thickness to secure hailplate 70 to platform 50. In one embodiment, the adhesive film thickness is between approximately three and five mils.

Accordingly, a hailplate is provided that facilitates providing impact resistance to a frangible fan platform in a cost-effective and reliable manner. Moreover, the hailplate facilitates improving the impact durability and erosion resistance without a significant increase in weight and without compromising the frangibility of the platform edge. By considering fan rotation along with probable foreign object trajectories, an area of vulnerability can be identified for sizing of the hailplate and for advantageous placement of the hailplate. As a result, a hailplate is provided which facilitates extending a useful life of a fan assembly in a cost-effective and reliable manner.

Exemplary embodiments of a fan platform and hailplate are described above in detail. The hailplate is not limited to the specific embodiments described herein, but rather each aspect of the hailplate may be utilized independently and separately from other aspect described herein. Each aspect can also be used in combination with other fan platform assemblies. The embodiments described above provide a cost effective hailplate that provides impact durability to a composite fan platform without significantly affecting the frangibility of the fan platform edges and without a significant increase in weight.

While the invention has been described in terms of various specific embodiments, those skilled in the art will recognize that the invention can be practiced with modification within the spirit and scope of the claims.

What is claimed is:

1. A fan platform for a gas turbine engine, said platform comprising:
   a body portion;
   a flow path surface coupled to said body portion, said body portion and said flow path surface defining at least a portion of a flow path extending through the engine; and
   an impact barrier reinforcing said flow path surface, said impact barrier comprising a layer of cladding metal having a contour that substantially conforms to a contour of a portion of said flow path surface, said impact barrier is bonded to said flow path surface.

2. A fan platform in accordance with claim 1 wherein said body and said flow path surface are each fabricated from a composite material.

3. A fan platform in accordance with claim 2 wherein said body and said flow path surface are each fabricated from a composite material that includes carbon fiber.

4. A fan platform in accordance with claim 1 wherein said cladding metal comprises aluminum.

5. A fan platform in accordance with claim 4 wherein said cladding metal has a thickness of about twenty thousandths inches.

6. A fan platform in accordance with claim 1 wherein said cladding metal comprises an anodized coating.

7. A fan platform in accordance with claim 1 wherein said cladding metal is etched.

8. A fan platform in accordance with claim 1 wherein said cladding metal is bonded to said flow path surface with an adhesive.

9. A gas turbine engine comprising:
a fan comprising a plurality of circumferentially-spaced fan blades; and
a fan platform extending between a pair of circumferentially-adjacent fan blades and defining a fan flow path therebetween, said platform comprising a flow path surface, a portion of said flow path surface comprising a layer of cladding metal bonded thereto, said cladding metal having a contour that substantially conforms to a contour of said flow path surface.

10. An engine in accordance with claim 9 wherein said fan platform is fabricated from a composite material.

11. An engine in accordance with claim 9 wherein said fan platform is fabricated from a composite material that includes carbon fiber.

12. An engine in accordance with claim 9 wherein said cladding metal comprises aluminum.

13. An engine in accordance with claim 12 wherein said cladding metal has a thickness of about twenty thousandths inches.

14. An engine in accordance with claim 9 wherein said cladding metal comprises an anodized coating.

15. An engine in accordance with claim 9 wherein said cladding metal is etched.

* * * * *